(12) United States Patent
Chiu

(10) Patent No.: US 6,703,716 B2
(45) Date of Patent: Mar. 9, 2004

(54) PERMANENT MAGNET GENERATOR FOR BICYCLE LIGHT OPERATION

(75) Inventor: Chun-Chen Chiu, Taichung Hsien (TW)

(73) Assignee: Meng-Yu Liu, Taichung Hsien (TW)

( * ) Notice: Subject to any disclaimer, the term of this patent is extended or adjusted under 35 U.S.C. 154(b) by 122 days.

(21) Appl. No.: 09/977,964

(22) Filed: Oct. 17, 2001

(65) Prior Publication Data

US 2003/0071464 A1 Apr. 17, 2003

(51) Int. Cl.[7] .................... H02P 9/00; B36K 11/00; B62M 23/02; H02K 11/00; H02K 7/00
(52) U.S. Cl. ............... 290/1 R; 180/205; 180/206; 310/67 A; 310/71; 310/75 C; 310/90; 310/263
(58) Field of Search ............... 290/1 R; 180/205, 180/206; 310/67 A, 71, 75 C, 90, 263

(56) References Cited

U.S. PATENT DOCUMENTS

| | | | | |
|---|---|---|---|---|
| 3,573,519 A | * | 4/1971 | Kumazawa | 310/156.66 |
| 4,191,988 A | * | 3/1980 | Kumakura | 362/473 |
| 4,364,448 A | * | 12/1982 | Ikuma | 180/206 |
| 4,559,462 A | * | 12/1985 | Hernandez-Badillo | 310/67 A |
| 4,636,670 A | * | 1/1987 | Kallstrom | 310/67 A |
| 4,677,328 A | * | 6/1987 | Kumakura | 310/67 R |
| 4,860,176 A | * | 8/1989 | Bauwens et al. | 310/67 A |
| 4,893,877 A | * | 1/1990 | Powell et al. | 362/464 |
| 4,924,125 A | * | 5/1990 | Clark | 310/67 R |
| 5,115,159 A | * | 5/1992 | Takamiya et al. | 310/67 A |
| 5,268,602 A | * | 12/1993 | Schwaller | 310/67 A |
| 5,461,269 A | * | 10/1995 | de Raucourt | 310/67 A |
| 5,505,277 A | * | 4/1996 | Suganuma et al. | 180/206 |
| 5,584,561 A | * | 12/1996 | Lahos | 362/473 |
| 5,602,448 A | * | 2/1997 | Yaguchi | 318/139 |
| 5,603,388 A | * | 2/1997 | Yaguchi | 180/206 |
| 5,606,207 A | * | 2/1997 | Gotoh | 310/67 A |
| 5,842,535 A | * | 12/1998 | Dennis | 180/205 |
| 5,857,762 A | * | 1/1999 | Schwaller | 362/473 |
| 5,874,792 A | * | 2/1999 | Chen et al. | 310/75 C |
| 5,895,991 A | * | 4/1999 | Butz | 310/75 C |
| 5,932,943 A | * | 8/1999 | Werner et al. | 310/67 A |
| 5,992,553 A | * | 11/1999 | Morrison | 180/206 |
| 6,002,187 A | * | 12/1999 | Ohkura et al. | 310/67 A |
| 6,118,196 A | * | 9/2000 | Cheng-Yon | 310/75 C |
| 6,320,336 B1 | * | 11/2001 | Eguchi | 318/139 |
| 6,398,395 B1 | * | 6/2002 | Hyun | 362/500 |
| 6,409,197 B1 | * | 6/2002 | Endo et al. | 280/288.4 |
| 6,486,582 B1 | * | 11/2002 | Patarchi | 310/166 |
| 6,559,564 B1 | * | 5/2003 | Itou | 310/67 A |
| 6,588,528 B2 | * | 7/2003 | Ligman | 180/206 |
| 6,588,913 B1 | * | 7/2003 | Huang | 362/96 |
| 6,605,884 B2 | * | 8/2003 | Nishimoto | 310/67 A |

FOREIGN PATENT DOCUMENTS

| | | | | |
|---|---|---|---|---|
| EP | 778654 A2 | * | 6/1997 | H02K/21/12 |
| EP | 1155948 A2 | * | 11/2001 | B62J/6/12 |
| GB | 2314213 A | * | 12/1997 | B62J/6/00 |
| JP | 07246967 A | * | 9/1995 | B62J/6/06 |
| JP | 11098797 A | * | 4/1999 | H02K/21/24 |
| JP | 2000069731 A | * | 3/2000 | H02K/21/22 |

* cited by examiner

Primary Examiner—Karl Tamai
Assistant Examiner—Pedro J. Cuevas
(74) Attorney, Agent, or Firm—Rabin & Berdo, P.C.

(57) ABSTRACT

A generator for a bicycle includes a rotor abutting a wheel of the bicycle. A coil is mounted in the rotor and electrically connected to two bearings that are mounted on the opposite sides of the rotor by two inner wires. A stator has a shaft extending through the two bearings and a permanent magnet sleeved onto the shaft and corresponding to the coil. Two electrical ring connectors are respectively mounted on opposite ends of the shaft and electrically connected to the bearings. A light is mounted on the bicycle and electrically connected to the electrical ring connectors. The coil will rotate with the rotor relative to the stator when the bicycle is in motion and generate electricity that is transmitted to the light, and the light improves the enjoyment and safety of riding the bicycle.

12 Claims, 5 Drawing Sheets

PERMANENT MAGNET GENERATOR FOR BICYCLE LIGHT OPERATION

BACKGROUND OF THE INVENTION

1. Field of the Invention

The present invention relates to a generator, and more particularly to a generator for a bicycle light or an audible device.

2. Description of Related Art

To promote bicycle safety when riding a bicycle in the dark, a front light is mounted on a head tube of the bicycle. The power source for the front light is a battery that is mounted on the bicycle. However, the battery needs to be replaced when the battery is exhaust. It is very inconvenient for a rider to exchange the exhausted battery and very dangerous riding in night without lighting device. Consequently, a conventional bicycle generator is provided for supplying power to a lighting device that is mounted on a bicycle. The generators from earlier generations were usually mounted on a rear wheel strut with a geared drive arm in contact with the sidewall of the rear wheel. The drive arm would weaken the wheel sidewall and lead to blowouts. The generator had to be adjusted so that the drive arm made good contact with the wheel sidewall. Because of the gears and linkage between the drive arm and the generator, the generator often had to be repaired or replaced.

The present invention has arisen to mitigate and/or obviate the disadvantages of the conventional power source for the bicycle.

SUMMARY OF THE INVENTION

The main objective of the present invention is to provide a simplified generator for a bicycle that is driven by the tread surface of a bicycle tire to generate electricity for a light or an audible device to improve the enjoyment and safety of riding a bicycle.

To achieve the objective, the generator for a bicycle in accordance with the present invention comprises a rotor abutting the tread of a wheel of the bicycle. A coil is mounted in the rotor and electrically connected to two bearings that are mounted on the opposite sides of the rotor by two inner wires. A stator has a shaft extending through the two bearings and a permanent magnet sleeved onto the shaft and corresponding to the coil. Two metal rings are respectively sleeved onto opposite ends of the shaft and electrically connected to the bearings. A light is mounted on the bicycle and electrically connected to the metal rings. The coil will rotate with the rotor relative to the stator when the bicycle is moving and generate electricity that is transmitted to the light, and the light improves the enjoyment and safety of riding the bicycle.

Further benefits and advantages of the present invention will become apparent after a careful reading of the detailed description with appropriate reference to the accompanying drawings.

DETAILED DESCRIPTION OF THE INVENTION

Figure 1:
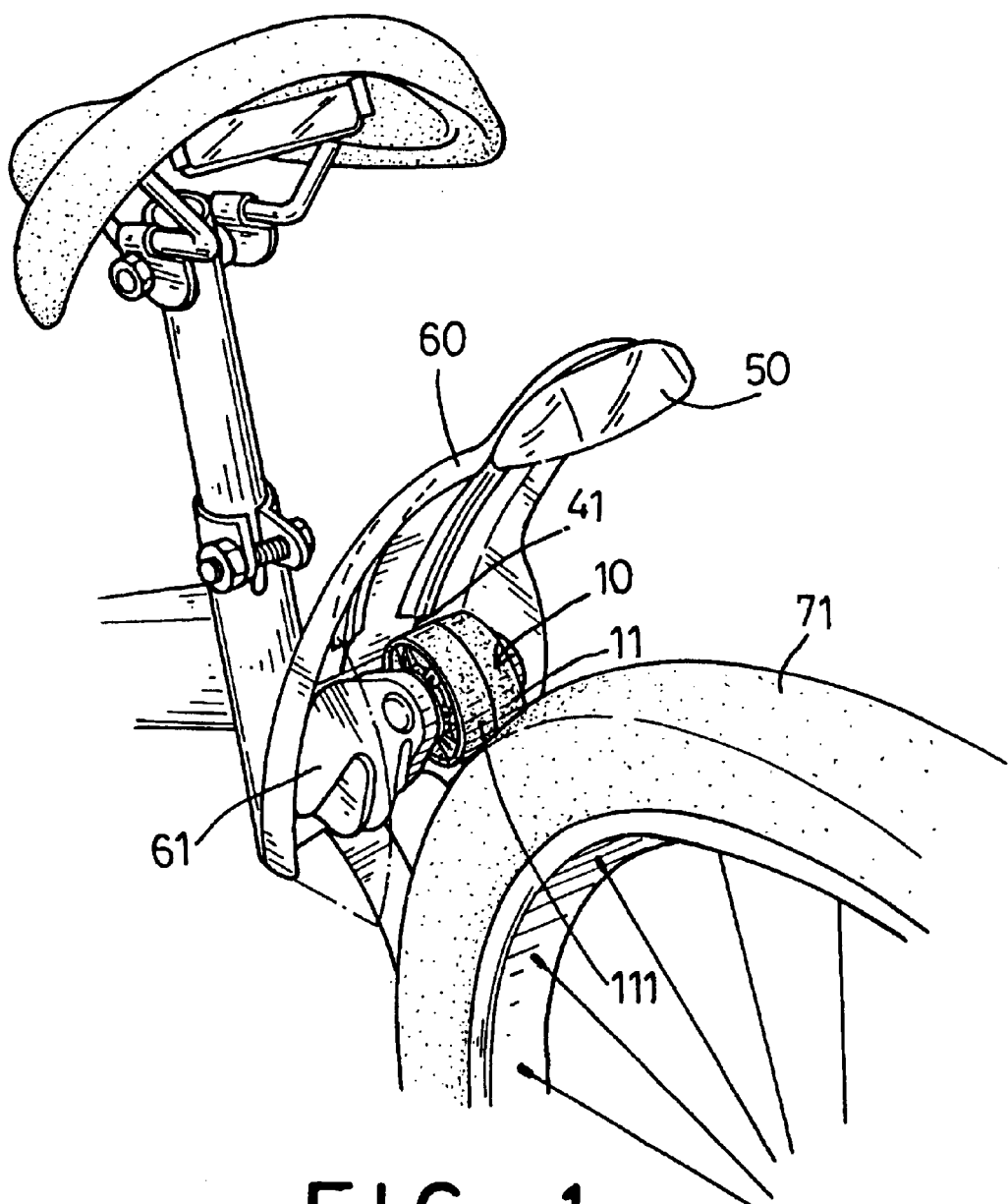
FIG. 1 is an operational perspective view of a generator for a bicycle in accordance with the present invention mounted on the bicycle.
Figure 2:
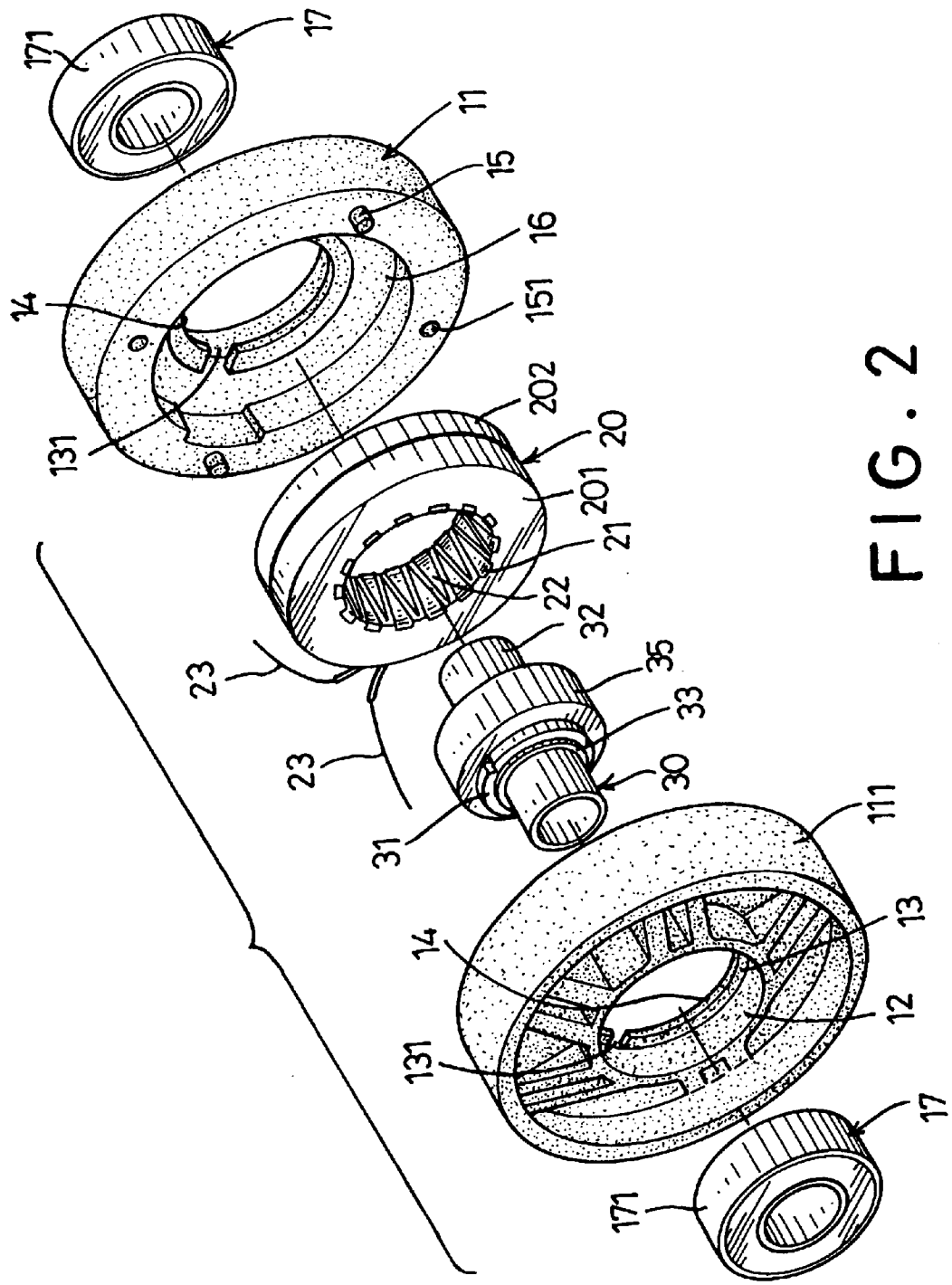
FIG. 2 is an exploded perspective view of the generator for a bicycle in FIG. 1.
Figure 3:
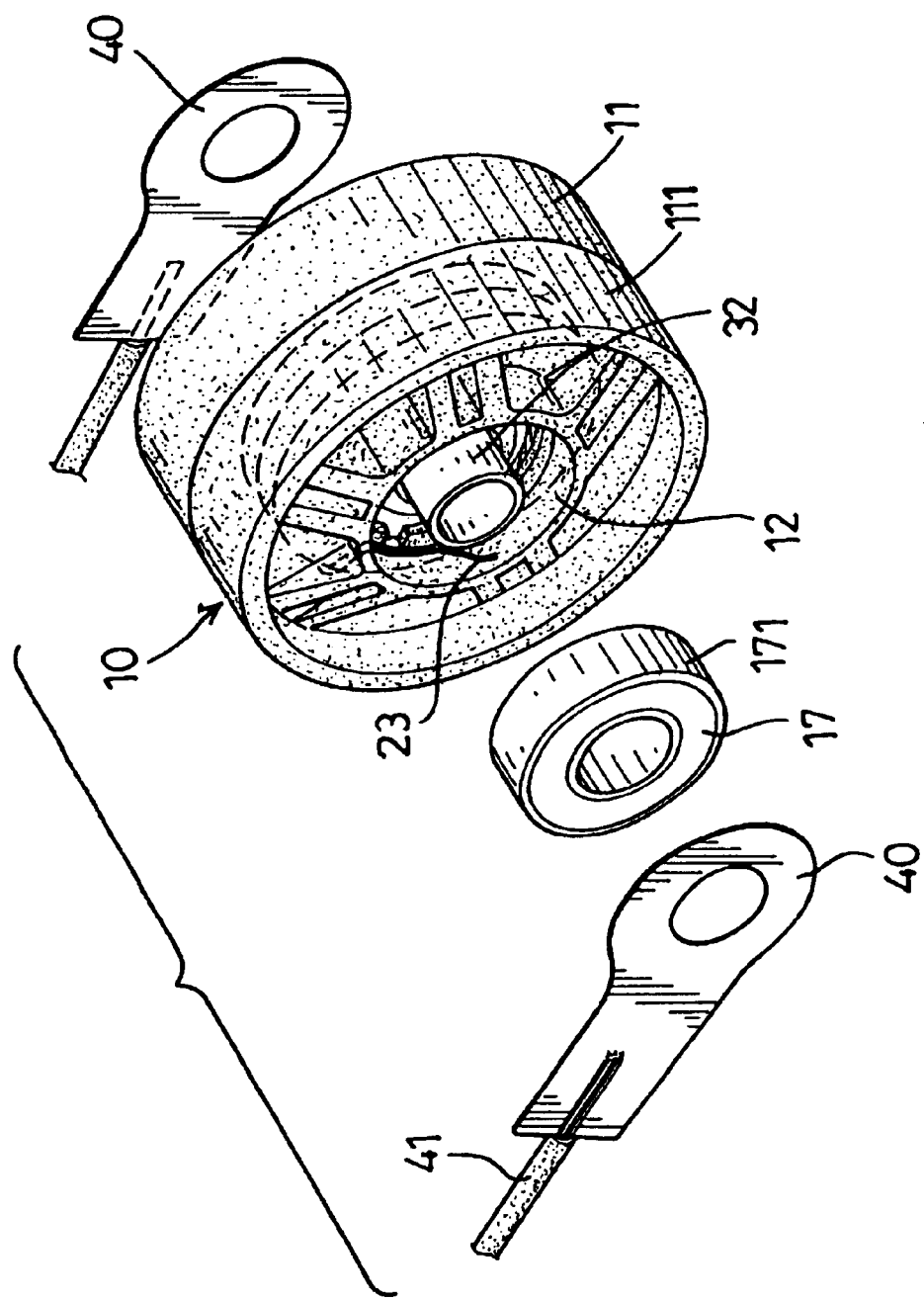
FIG. 3 is a partially exploded perspective view of the generator for a bicycle in FIG. 1.

With reference to the drawings and initially to FIGS. 1–3, a generator for a bicycle in accordance with the present invention comprises around rotor (10), an annular coil (20) secured in the rotor (10) and a stator (30) rotatably extending through the rotor (10) and the coil (20).

The rotor (10) includes two casings (11, 111) abutting each other to form a chamber (not numbered) in the rotor (10). Each of the two casings (11, 111) includes a first side (not numbered) and a second side. The first side of each casing (11, 111) abuts the first side of the other casing (11, 111). A recess (16) is centrally defined in the first side of each casing (11, 111) to align with the recess in the other casing (11, 111). A hole (12) is centrally defined in each casing (11, 111) to align with the hole (12) in the other casing (11, 111). The hole (12) has a diameter smaller than that of the recess (16) and communicates with the recess (16). The recess (16) includes a bottom having an annular flange (13) inwardly and radially extending from the bottom of the recess (16) to form a passage (14) communicating with the hole (12) and the recess (16) so that the passage (14) has a diameter smaller than that of the hole (12). An indent (131) is defined in the flange (13) and laterally communicates with the passage (14). Each first side of the casings (11, 111) has at least one stud (15) perpendicularly extending from the casing (11, 111) and one bore (151) perpendicularly defined in the casing (11, 111) to securely receive a corresponding stud (15) to connect the two casings (11, 111). A bearing (17) is securely mounted in the hole (12) in each casing (11, 111) and abuts the annular flange of the casings (11, 111).

The coil (20) comprises two metal covers (201, 202), a coil seat (not shown), a winding (not shown) and two inner wires (23). The metal covers (201, 202) abut each other to enclose a coil seat (not shown) and are soldered to each other. The winding (not shown) is wound around the coil seat. Each of the metal covers (201, 202) has multiple salient poles (21, 22) perpendicularly extending from the inner periphery of each cover (201, 202) parallel to the axis of rotation and abutting the inner periphery of the coil seat, such that each cover (201, 202) will securely attach to one side of the coil seat. The salient poles (21) of the metal cover (201) correspond to that of the metal cover (202). The two inner wires (23) are respectively electrically connected to the two metal covers (201,202) and extend respectively into the holes (12) through the indents (141). One end of each inner wire (23) extending into the corresponding hole (12) is electrically connected to the outer periphery of a corresponding one of the bearings (17), such that each bearing (17) is further used as a collector.

Figure 4:
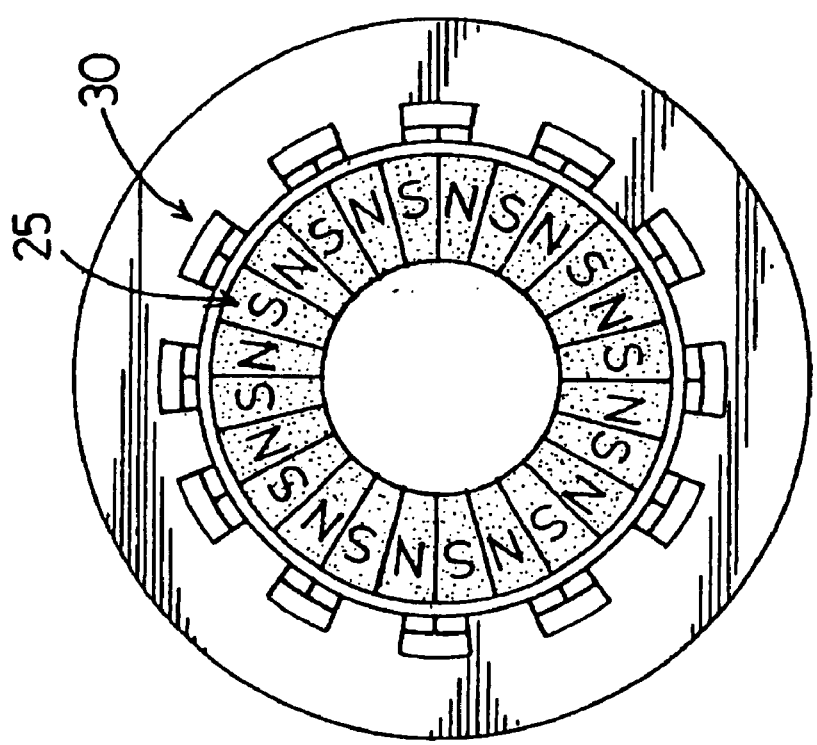
FIG. 4 is a side plan view of the coil and the permanent magnet in FIG. 2.

The stator (30) comprises an insulating shaft (32), an annular flange (31) and a ring of permanent magnets (35). The insulating shaft (32) rotatably extends through the coil (20) and has two opposite ends secured in the bearings (17) of the rotor (10). The annular flange (31) radially extends outwardly from the middle portion of the shaft (32). The ring of permanent magnets (35) is mounted on the outer periphery of the annular flange (31). The permanent magnets (35) correspond to the salient poles (21, 22) in the metal covers (201, 202). Further with reference to FIG. 4, the magnetic poles of the permanent magnet (35) alternate around the ring of permanent magnets (35). Two protrusions (33) extend respectively from two opposite side of the annular flange (31) around the shaft (32) to the middle portions of the bearings (17).

An electrical ring connector (40) is mounted on each end of the shaft (32) and abuts and electrically connects with the middle portion of a corresponding one of the bearings (17). One end of an outer wire (41) is electrically connected to the metal ring (40), and the other end is adapted to be electrically connected to a light (50) or an audible device (not shown). With reference top FIG. 5, the light (50) or the audible device can be mounted anywhere on the frame (70) of the bicycle. The light (50) can include multiple lights that can be mounted on the fender (60), the handlebar (73) the fork (74) or, the seat (72).

Figure 5:
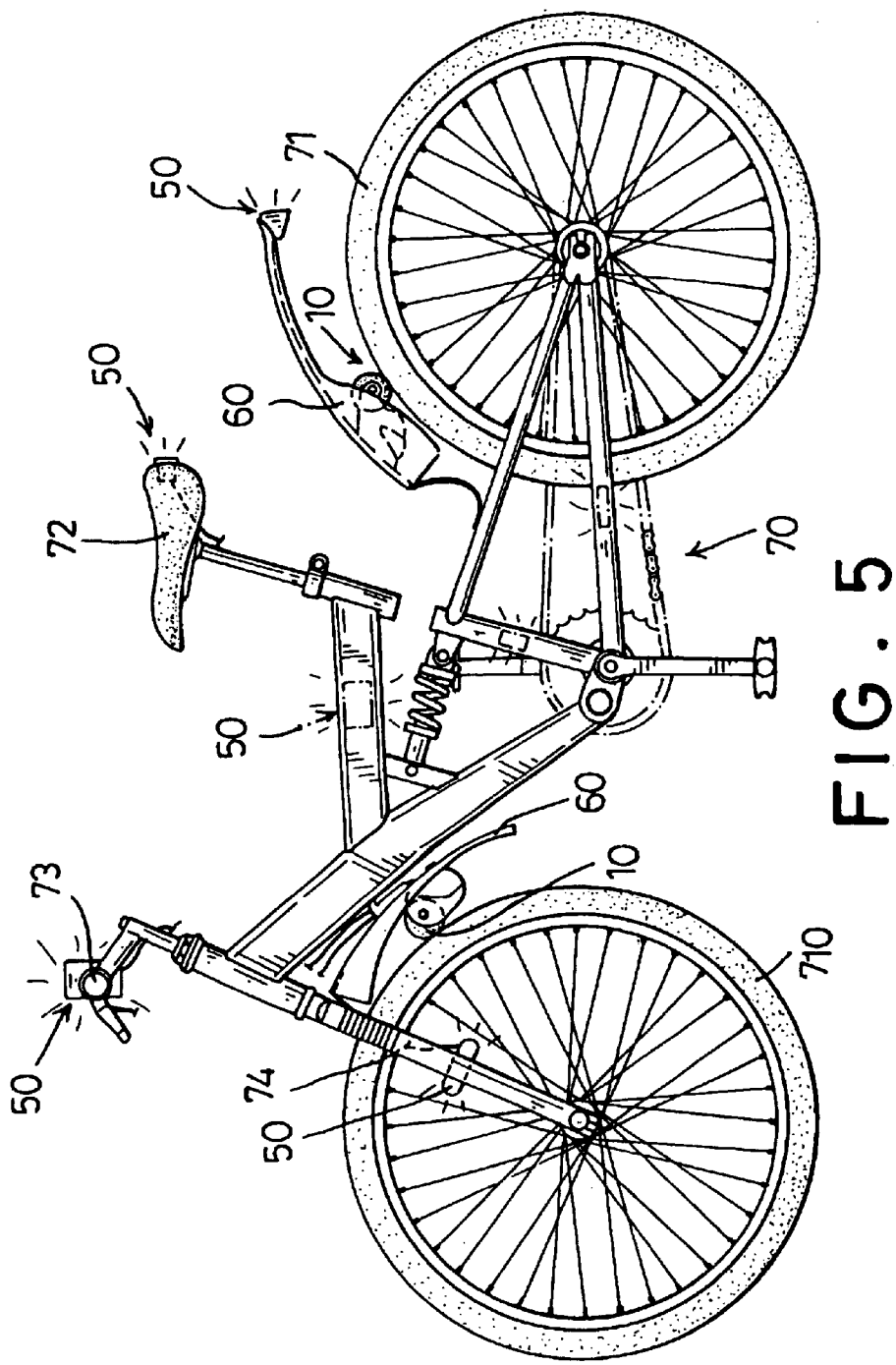
FIG. 5 is an operational side plan of the generator for a bicycle when the bicycle is in use and the light works.

With reference to FIGS. 1 and 5, the generator for a bicycle in accordance with the present invention is mounted on the frame (70) of the bicycle near one of the wheels (71, 710) of the bicycle by an insulating bracket (61). Accordingly, when the bicycle is in use and the wheels (71, 710) rotate, the coil (20) will rotate with the casings (11, 111) relative to the stator (30). The coil windings will cut through the magnetic line of flux of the permanent magnet (35) and generate electricity. The electricity will be transmitted to the light or the audible device through the covers (201, 202), the inner wires (23) connected to the metal covers (201, 202), the bearings (17), the electrical ring connectors (40) and the outer wires (41) connected to the metal rings (40) to the light (50) or the audible device. Consequently, the enjoyment of riding the bicycle is improved. In addition, the light (50) or the audible device provides a warning effect to other people at night. The safety of riding the bicycle is also improved.

Although the invention has been explained in relation to its preferred embodiment, it is to be understood that many other possible modifications and variations can be made without departing from the spirit and scope of the invention as hereinafter claimed.

What is claimed is:

1. A permanent magnet generator for a bicycle light mounted on a bicycle that includes a frame, wheels rotatably mounted on the frame and an insulating bracket attached to the frame, the generator comprising:

a rotor with an axis of rotation adapted to be rotatably mounted on the insulating bracket and adapted to abut against one of the wheels of the bicycle, the rotor including:

two casings each having a first side abutting each other to form a chamber in the rotor and a second side opposite to each other;

a hole with a diameter and an inner periphery centrally defined in the second side of each casing to securely mount a bearing with an outer periphery and a middle portion in the rotor;

a recess with an inner periphery centrally defined in the first side of each casing and having a diameter greater than that of the hole; and an indent defined in the inner periphery of each recess;

an annular coil securely mounted in the chamber in the rotor, the annular coil including:

two metal covers abutting each other and soldered to enclose a coil seat and a winding wound around the coil seat;

multiple salient poles situated in an inner periphery of each cover and parallel to the axis of rotation; and two inner wires electrically connected respectively to the covers and extending through the indents in the casings to electrically connect respectively to the outer peripheries of the bearings;

a stator rotatably extending through the rotor and the coil, the stator including:

a shaft made of insulating material, rotatably extending through the coil, having two opposite ends respectively secured in the bearings and a middle portion and partially extending out of the bearings and mounted in the insulating bracket of the bicycle for mounting the rotor on the bicycle;

an annular flange radially extending outwardly from the middle portion of the shaft and having an outer periphery; and a ring of permanent magnets mounted on the outer periphery of the annular flange and corresponding to the salient poles of the coil;

two electrical rings respectively mounted around the ends of the shaft and electrically connected to the middle portions of the bearings; and two outer wires each having a first end electrically attached to one of the electrical rings and a second end attached to the bicycle light;

wherein the coil rotates with the casings relative to the stator when the bicycle is in use and generates electricity that is transmitted to the light to operate the light.

2. The generator for a bicycle as claimed in claim 1, wherein the recess in each casing comprises a bottom having an annular flange inwardly and radially extending from the bottom of the recess to stop the corresponding one of the bearings and form a passage communicating with the hole and the recess, and the indent is defined in the annular flange.

3. The generator for a bicycle as claimed in claim 1, wherein each casing comprises at least one stud perpendicularly extending from the first side and at least one bore defined in the first side to securely receive a corresponding stud extending from the first side of the other casing.

4. The generator for a bicycle as claimed in claim 1, wherein the stator comprises two protrusions extending respectively from two opposite sides of the annular flange of the stator to abut the middle portions of the bearings.

5. The generator for a bicycle as claimed in claim 2, wherein each casing comprises at least one stud perpendicularly extending from the first side and at least one bore defined in the first side to securely receive a corresponding stud.

6. The generator for a bicycle as claimed in claim 2, wherein the stator comprises a protrusion extending from two opposite sides of the annular flange of the stator and to abut the middle portion of the bearing.

7. The generator for a bicycle as claimed in claim 3, wherein the stator comprises two protrusions respectively extending from two opposite sides of the annular flange of the stator to abut the middle portions of the bearings.

8. The generator for a bicycle as claimed in claim 4, wherein the permanent magnets have magnetic poles that alternate around the permanent magnets.

9. The generator for a bicycle as claimed in claim 5, wherein the stator comprises two protrusions extending respectively from two opposite sides of the annular flange of the stator to abut the middle portions of the bearings.

10. The generator for a bicycle as claimed in claim 6, wherein the permanent magnets have magnetic poles that alternate around the permanent magnets.

11. The generator for a bicycle as claimed in claim 7, wherein the permanent magnets have magnetic poles that alternate around the permanent magnets.

12. The generator for a bicycle as claimed in claim 9, wherein the permanent magnets have magnetic poles that alternate around the permanent magnets.

* * * * *